United States Patent [19]
Allen et al.

[11] Patent Number: 5,814,115
[45] Date of Patent: Sep. 29, 1998

[54] GREASE FILTER FOR EXHAUST SYSTEMS IN COMMERCIAL FOOD PREPARATION ENVIRONMENTS

[76] Inventors: Darryl Allen, 8712 W. Central, Sylvania, Ohio 43560; David Westfall, 5854 N. Yermo, #Q-1, Toledo, Ohio 43613

[21] Appl. No.: 774,944

[22] Filed: Dec. 27, 1996

Related U.S. Application Data

[60] Provisional application No. 60/009,457 Dec. 29, 1995.

[51] Int. Cl.⁶ ........................................ B01D 35/02
[52] U.S. Cl. ..................... 55/350.1; 55/323; 55/326; 55/357; 55/421; 55/423; 55/486; 55/DIG. 36; 96/139
[58] Field of Search ............................. 55/320, 323, 326, 55/327, 357, 421, 423, 466, 486, 494, DIG. 36, 511, 350.1; 96/134, 138, 139; 126/299 D, 299 E, 299 F, 299 R

[56] References Cited

U.S. PATENT DOCUMENTS

| | | | |
|---|---|---|---|
| 2,874,627 | 2/1959 | Simmonds | 126/299 D |
| 3,849,312 | 11/1974 | Wecker, Sr. | 55/357 |
| 4,266,529 | 5/1981 | Gaylord | 55/DIG. 36 |
| 4,726,825 | 2/1988 | Natale | 55/350.1 |
| 4,869,236 | 9/1989 | Blough | 55/DIG. 36 |
| 4,887,587 | 12/1989 | Deutsch | 55/DIG. 36 |
| 5,020,511 | 6/1991 | Liu | 55/DIG. 36 |
| 5,318,607 | 6/1994 | Malloy et al. | 55/323 |
| 5,540,744 | 7/1996 | Renna | 55/DIG. 36 |
| 5,567,216 | 10/1996 | Mirza et al. | 55/DIG. 36 |

*Primary Examiner*—Jay H. Woo
*Assistant Examiner*—Minh-Chau T. Pham
*Attorney, Agent, or Firm*—Bliss McGlynn, P.C.

[57] ABSTRACT

A grease filter system for use in connection with retaining viscous products of combustion in commercial food preparation environments includes a receptacle and a filter element removably supported within the receptacle. The receptacle has a lid covering one end thereof and a bottom. The lid includes an opening through which grease, condensed steam, water and other products of combustion enter the system. The receptacle further includes a plurality of apertures disposed spaced from the bottom about the perimeter of the receptacle such that the filter system retains grease and other viscous fluids while allowing condensed steam, water and other products of combustion to pass through the filter element and the receptacle out through the apertures.

19 Claims, 4 Drawing Sheets

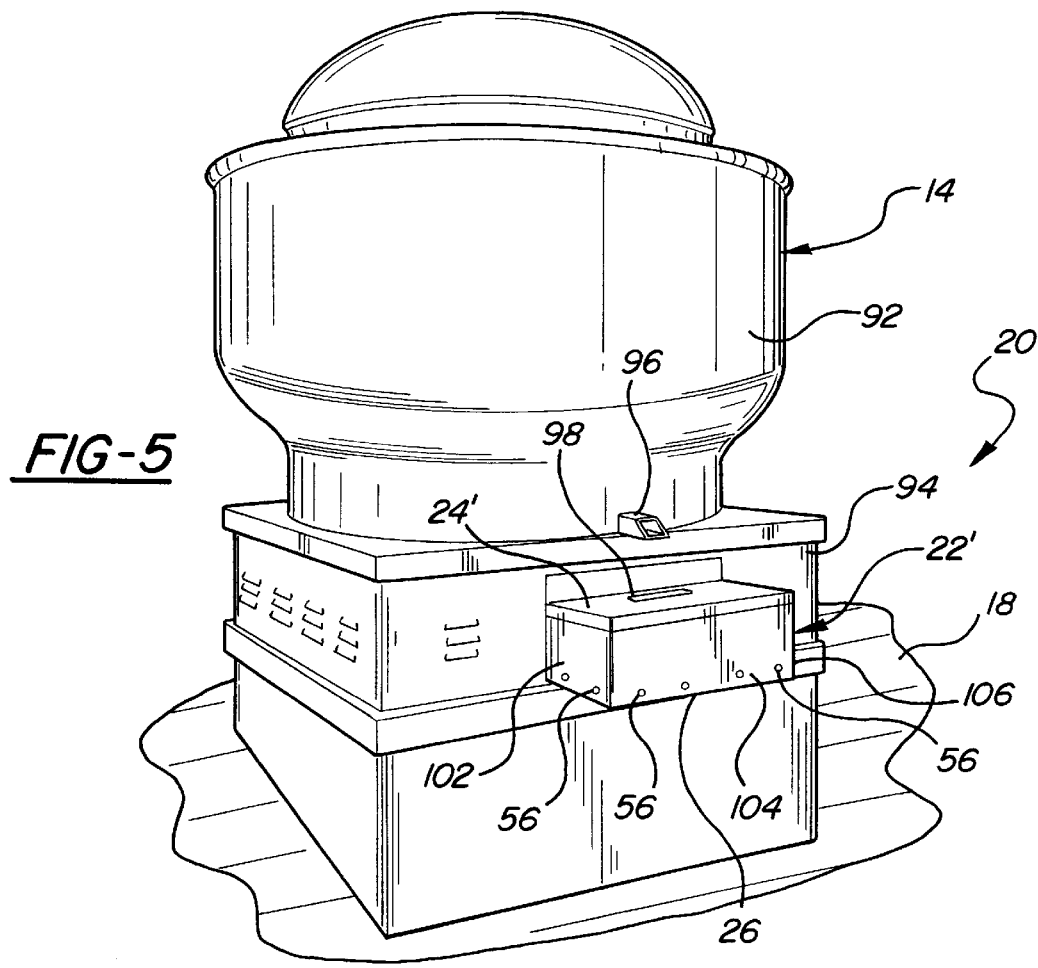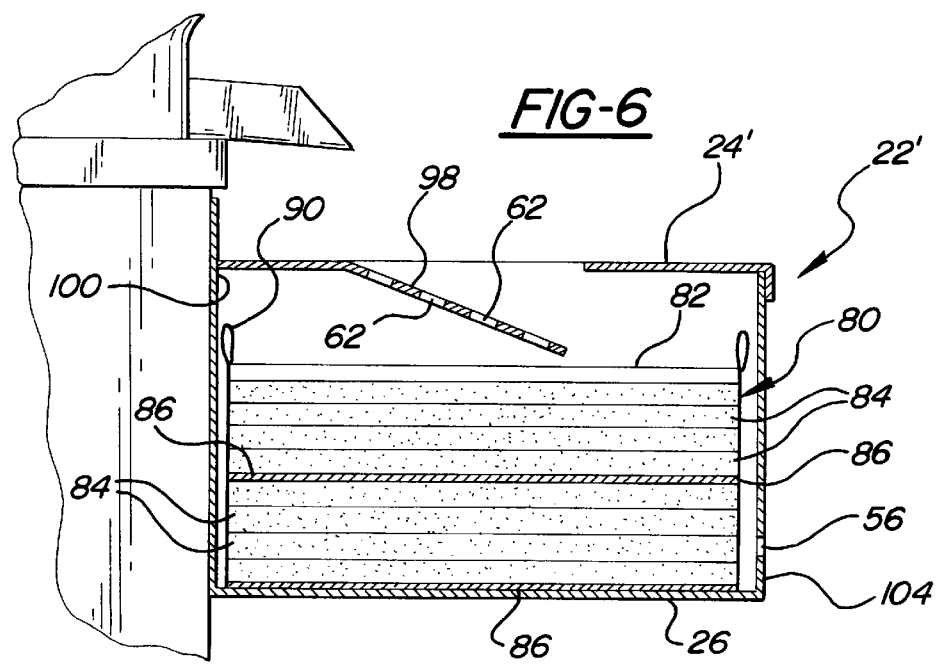

GREASE FILTER FOR EXHAUST SYSTEMS IN COMMERCIAL FOOD PREPARATION ENVIRONMENTS

This application claims priority to and all benefits from the copending provisional application having United States Ser. No. 60/009,457 filed Dec. 29, 1995 and entitled Grease Filter for Exhaust Systems In Commercial Food Preparation Environments.

BACKGROUND OF THE INVENTION

1. Field Of the Invention

The present invention relates to a grease filter and, more specifically, to a grease filter for exhaust systems employed in commercial food preparation environments.

2. Description Of the Related Art

Restaurants, caterers, banquet halls, cafeterias and other places where large quantities of food are prepared use industrial cooking implements to prepare this food. More specifically, large ovens, grills, stoves, deep fryers and other cooking implements are employed in the preparation of various food products. Above the various cooking implements is a hood which funnels heat, smoke, steam, grease and other products of combustion through an exhaust system which typically extends through the ceiling of the building and vents the products of combustion to the atmosphere on the roof.

One recurring problem with venting the products of combustion in a commercial cooking environment involves the accumulation of grease in the roof vents and fans of the exhaust system. The grease eventually runs off the vents and fans onto the roof which is typically made of a tar or asphalt based product. Such grease, as a product of combustion in commercial cooking environments, is detrimental to these roofs. More specifically, the grease degrades and eats away at the tarred roofs and ultimately causes leaking which can lead to other, serious problems.

The damage caused by grease vented to the roof in such commercial cooking environments has long been an expensive, time consuming, maintenance problem. The present invention overcomes these problems in the prior art in an inexpensive, efficient and cost effective grease filter for use in commercial cooking exhaust systems employed in commercial food preparation environments such as in restaurants, caterers, banquet halls and cafeterias.

SUMMARY OF THE INVENTION

The present invention is directed toward a grease filter system for use in connection with retaining viscous products of combustion in commercial food preparation environments. The filter system includes a receptacle and a filter element removably supported within the receptacle. The receptacle has a top covering one end thereof and a bottom. The top includes an opening through which grease, condensed steam, water and other products of combustion may enter the system. The receptacle further includes a plurality of apertures disposed spaced from the bottom about the perimeter of the receptacle such that the filter system retains grease and other viscous fluids in the filter element while allowing condensed steam, water and other products of combustion to pass through the filter element and out the receptacle through the apertures.

Rain water, condensed steam, grease and other products of combustion are directed from the exhaust system into the receptacle and across the filter element of the grease filter system of the present invention. The rain water, condensed steam and other similar products of combustion flow through the filter and out the holes at the bottom of the receptacle. However, the grease is retained within the filter element in the receptacle and does not allow it to pass onto the roof.

Other features and advantages of the present invention will be readily appreciated as the same becomes better understood after reading the subsequent description when considered in connection with the accompanying drawings.

BRIEF DESCRIPTION OF THE DRAWINGS

FIG. 5 is a perspective view of a portion of an exhaust system including the grease filter of the present invention; and FIG. 6 is a partial cross-sectional side view of the filter system illustrated in FIG. 5.

DETAILED DESCRIPTION OF THE PREFERRED EMBODIMENT(S)

Figure 1:
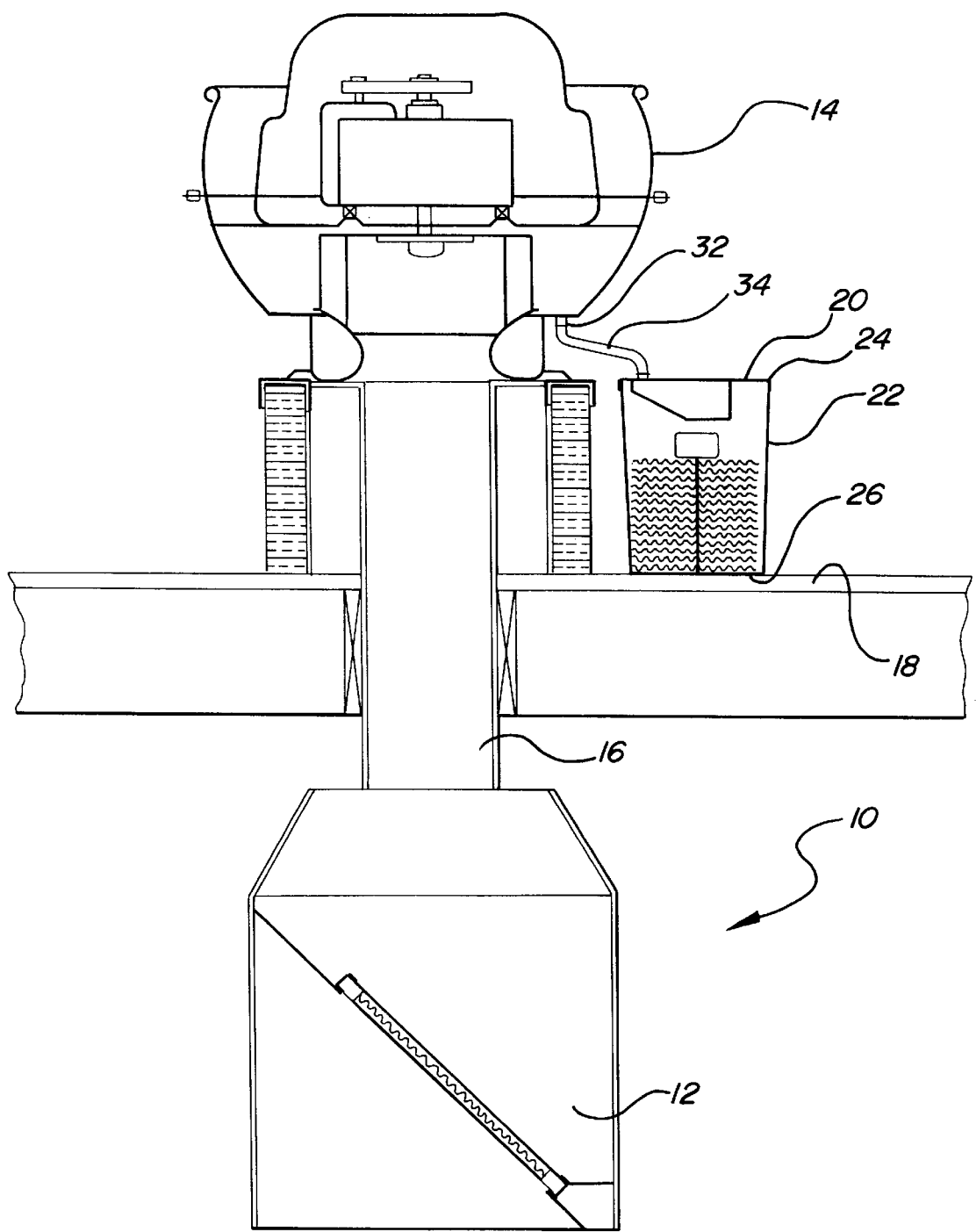
FIG. 1 is a schematic view of an exhaust system for use in commercial food preparation environments including the grease filter system of the present invention.

An exhaust system for use in a commercial food preparation environment such as in restaurants, caterers, banquet halls, cafeterias and the like is generally shown at 10 in FIG. 1. The exhaust system 10 includes a hood 12 and an exhaust fan 14. A chimney 16 extends between the hood 12 and fan 14 and through the roof or ceiling structure, generally indicated at 18, of a building. The products of combustion such as heat, smoke, steam, grease etc. generated during the preparation of food are captured in the hood 12 and vented through chimney 16 and fan 14. It is to be understood, however, that the exhaust system employed in such an environment may include additional and/or different elements. For example, an upblast roof vent may be substituted for the fan 14 and other changes to the exhaust system may also be made which have no effect on the scope of the present invention.

Figure 2:
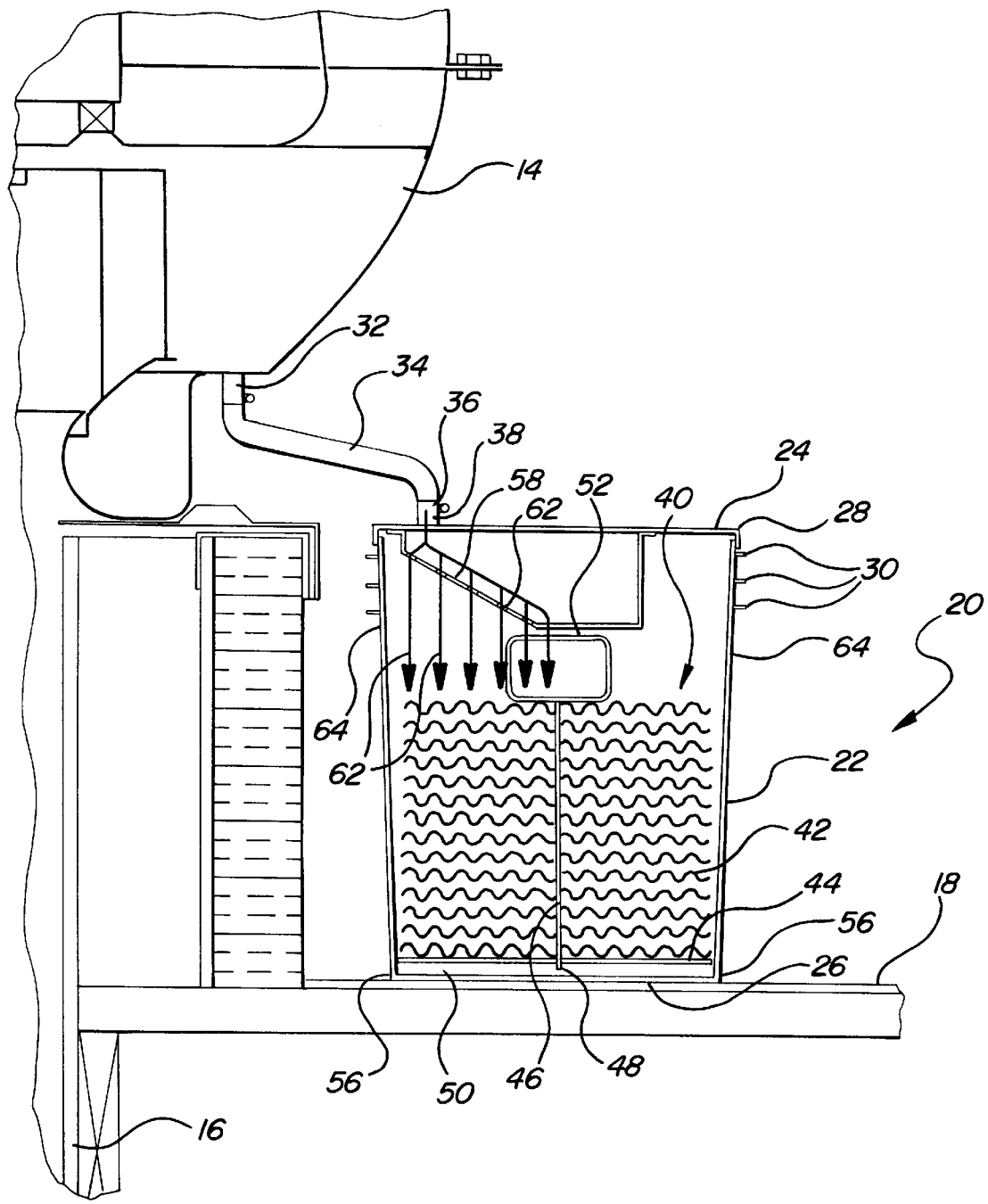
FIG. 2 is a cross-sectional side view of the grease filter system of the present invention.

A grease filter system is generally indicated at 20 and is operatively connected to the fan 14, vent, or any other element of the roof supported portion of the exhaust system. As best shown in FIG. 2, the grease filter system 20 includes a receptacle 22 having a top, which, in one embodiment may form a lid 24 covering one end and a bottom 26 which may be supported by the roof 18 of the building. The receptacle 22 may be of any shape, but in the embodiment disclosed in FIGS. 1, 2 and 4, the receptacle 22 is substantially cylindrical in shape and circular in cross-section with a slight taper to the sidewalls thereof diverging from the bottom 26 to the lip 28 which is covered by the lid 24. A plurality of ribs 30 may be employed proximal to the lip 28 for adding strength to the receptacle 22. The receptacle 22 may have a volume of 5 gallons and may be made from plastic, metal or any other suitable material.

The grease filter system 20 may be operatively connected to an outlet 32 or other orifice extending from the fan or roof vent via a flexible drain tube 34. A drain tube fitting 36 couples the drain tube 34 to an inlet 38 in the lid 24.

A filter element, generally indicated at 40, is removably received within the receptacle 22 and includes a filter member 42 which substantially conforms to the shape of the receptacle 22. The filter member may be made of a number of different materials. One such material may be a C-media which is available from Ohio Air Systems, Inc., in Toledo, Ohio. The filter element 40 further includes a base bracket 44 on which the filter member 42 is supported and a core shaft 46 which extends through the center of the filter member 42 and through the base bracket 44 to present at least one stud member 48. The stud member 48 engages the bottom 26 of the receptacle 22 and serves to space the base bracket 44 and thus the filter element 42 from the bottom 26 of the receptacle 22 by a predetermined distance. More specifically, as best illustrated in FIG. 2, this arrangement presents a gap 50 between the bottom 26 of the receptacle and the filter element 40.

A handle 52 is operatively attached to the core shaft 46 at the point opposite the stud member 48 to facilitate the insertion and removal of the filter element 40 into and out of the receptacle 22.

A plurality of apertures 56 extend through the receptacle 22 disposed about the circumference of the cylindrical sidewalls corresponding to the gap 50 between the filter element 40 and the bottom 26 of the receptacle 22 for a purpose to be explained in greater detail below. Similarly, the receptacle 22 includes a plurality of apertures 64 extending therethrough and disposed about the circumference of the cylindrical sidewalls just below the ribs 30 and near the lip 28 thereof. The apertures 64 provide ventilation for the system 20, cooling it in hot conditions and venting the gaseous exhaust in all conditions.

Figure 3:
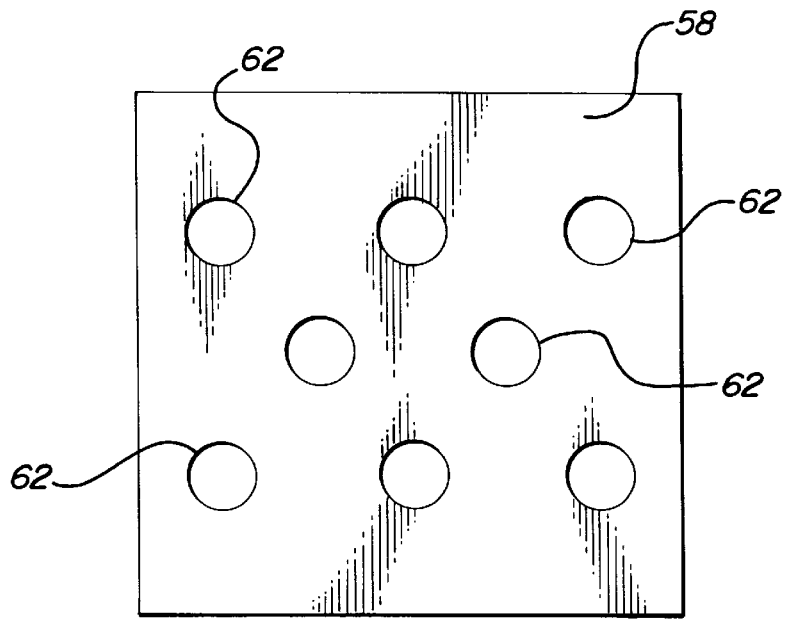
FIG. 3 is a top plan view of the grease dispersion tray employed in the grease filter system of the present invention.

A grease dispersion tray 58 is fixed to the bottom of the lid 24 and includes a plurality of holes 62 which are shown in FIG. 3 but which are represented by flow paths in FIG. 2. The grease dispersion tray 58 may include an inclined portion 60 through which the holes 62 extend for dispersing the products of combustion across the filter element 40.

In its operative mode, the grease filter system 20 of the subject invention allows rain water, condensed steam, grease and other liquid by-products of combustion to flow from the fan or roof vent of an exhaust system for a commercial food preparation environment without allowing grease to be dumped onto the roof 18 of a building. More specifically, rain water, condensed steam and other liquid by-products of combustion will flow through the outlet 32, through the drain tube 34 and into the inlet 38 of the lid 24 of the receptacle 22. The rain water, condensed steam, grease and other products of combustion will then flow over the dispersion tray 58 through the holes 62 and then onto the filter element 40. Rain water, condensed steam and other such products of combustion will pass completely through the filter member 42 and into the space or gap 50 between the base bracket 44 of the filter element 40 and the bottom 26 of the receptacle 22. Water and other such fluids will then flow out the circumferentially disposed holes 56 of the receptacle 22 onto the roof 18 and will be removed via the roof's drainage system. The grease and all such other viscous fluids, on the other hand, will be captured by the filter member 42.

When the filter member 42 is spent, the spent filter element 40 can be easily removed by an operator grasping the handle 52 and a new filter element 40 inserted into the receptacle 22.

Figure 4:
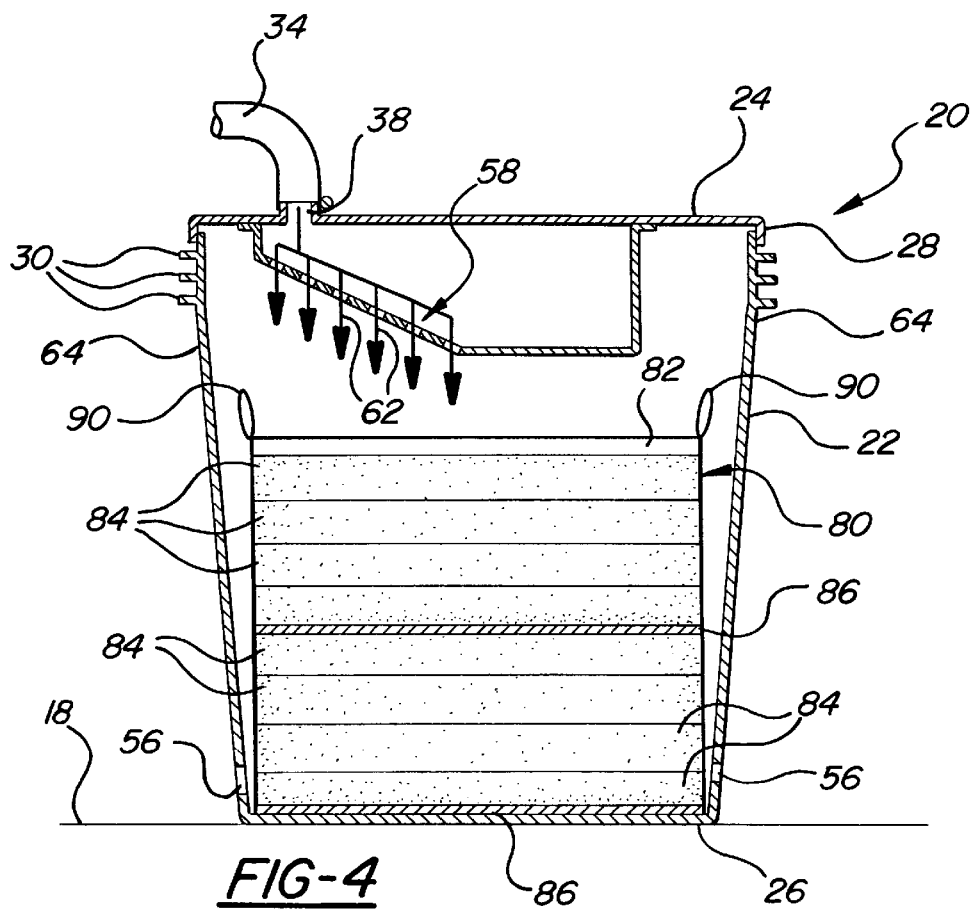
FIG. 4 is a cross-sectional side view of an alternative embodiment of the grease filter system of the present invention.

Another embodiment of the grease filter system 20 of the present invention is shown in FIG. 4 wherein like numerals are used to indicate like structure among the figures. More specifically, the grease filter system 20 shown in FIG. 4 includes a receptacle 22 having a top, which in this embodiment forms a lid 24 covering one end and a bottom 26 which may be supported by the roof 18 of the building. Like the receptacle 22 shown in FIGS. 1 and 2, the receptacle 22 illustrated in FIG. 4 may be of any shape, but in the embodiment disclosed in this Figure, it is substantially cylindrical in shape and circular in cross-section with a slight taper to the sidewalls thereof diverging from the bottom 26 to the lip 28 which is covered by the lid 24. A plurality of ribs 30 may be employed proximal to the lip 28 for adding strength to the receptacle 22. The receptacle 22 may have a volume of five gallons and may be made from plastic, metal, or any other suitable material.

The grease filter system 20 is operatively connected to a fan or roof vent via a flexible drain tube 34 through an inlet 38 in the lid 24. A plurality of apertures 56 extend through the receptacle 22 disposed about the circumference of the cylindrical sidewalls and disposed spaced from the bottom 26 of the receptacle 22. Similarly, the receptacle 22 includes a plurality of apertures 64 extending therethrough and disposed about the circumference of the cylindrical sidewalls just below the ribs 30 and near the lip 28 thereof. The apertures 64 provide ventilation for the system 20, cooling it in hot conditions and venting the gaseous exhaust in all conditions.

A grease dispersion tray 58 is fixed to the bottom of the lid 24 and includes a plurality of holes 62 which are shown in FIG. 3 and represented by flow paths in FIG. 4.

The grease filter system 20 of the present invention as illustrated in FIG. 4 also includes a filter element, generally indicated at 80, which is removably received within the receptacle 22. The filter element 80 includes a cartridge 82 and a plurality of filter members 84. The cartridge is made of a needle punched polypropylene sorbent, a flexible cloth-like filter material. The filter members 84 are cylindrical in shape and circular in cross-section and conform to the shape of the cartridge 82. Furthermore, the filter members 84 are stacked one on top of the other within the cartridge 82. More specifically, there are eight filter members 84 made of C-Media filter material which may be purchased from Ohio Air Systems, Inc. in Toledo, Ohio. A filter divider 86 is disposed between the two groups of four filter members 84 as well as between the bottom 26 of the receptacle 22 and the next adjacent filter member 84. As with the filter members 84, the divider 86 is cylindrical in shape and circular in cross-section and conforms to the shape of the cartridge 82. However, the dividers 86 are thinner than the filter members 84 and are made of a polypropylene homopolymer which is a cloth-like filter absorbent material and is more dense than the filter member 84. The filter divider 86 may also be purchased from Ohio Air Systems, Inc. Both the filter members 84 and dividers 86 are porous, allowing water to pass therethrough while retaining grease and other such viscous fluids within the filter element 80 as discussed in greater detail below.

In its operative mode, the grease filter system 20 of the subject invention shown in FIG. 4 allows rain water, condensed steam, grease and other liquid byproducts of combustion to flow from the roof or fan vent of an exhaust system for a commercial food preparation environment without allowing grease to be dumped onto the roof 18 of a building. More specifically, rain water, condensed steam and other liquid byproducts of combustion will flow through the inlet 38 of the lid 24 of the receptacle 22 and then over the dispersion tray 58 through the hole 62 and into the open ended cartridge 82 onto the filter members 84. Rain water, condensed steam and other such products of combustion pass completely through the filter member 84 as well as the dividers 86 and then out the cartridge 82. Water and other such fluids will then flow out the circumferentially disposed holes 56 of the receptacle 22 onto the roof 18 and will be removed via the roof's drainage system. On the other hand, grease and all other such viscous fluids will be captured by combination of the filter members 84, the filter dividers 86 as well as the cartridge 82. In this way, water, steam, etc. is allowed to pass through the filter system 20 while grease and other such viscous fluids are retained therein.

When the filter element 80 is spent, it may be easily removed by an operator by grasping handles 90 disposed at the upper portion of the filter element 80 and a new filter element 80 inserted into the receptacle 22.

Another embodiment of the present invention is shown in FIGS. 5 and 6 wherein like numerals are used to indicate like structure among the figures. FIG. 5 is a perspective view illustrating the fan 14 of the exhaust system 10. The fan 14 has a shroud 92 mounted on duct work 94. A grease filter system 20 is mounted to the duct work 94 and adapted to catch or otherwise receive grease, etc., which exits the fan 14 via trough 96. The filter system 20 includes a receptacle 22' which is made of sheet metal, such as stainless steel or aluminum. The receptacle 22' is mounted to the duct work 94 and includes a top, which in this embodiment forms a lid 24' and a bottom 26. Like the receptacles 22 shown in FIGS. 1, 2 and 4, the receptacle 22' illustrated in FIGS. 5 and 6 may be made of any shape, but in the embodiment disclosed in this Figure, it is substantially rectangular or square having side walls 100, 102, 104 and 106. Furthermore, the receptacle 22' is mounted so as to abut the duct work 94 of the exhaust system 10.

The receptacle 22' further includes a plurality of apertures 56 which extend therethrough and are disposed about the perimeter of the side walls 102, 104 and 106.

The lid 24' includes a portion 98 disposed at an incline relative to the plane of the lid 24'. The portion 98 includes a plurality of apertures 62 over which grease and other fluids flow and are dispersed into the filter system 20.

The grease filter 20 of the present invention as illustrated in FIGS. 5 and 6 further include a filter element, generally indicated at 80. The filter element 80 is removably received within the receptacle 22'. The filter element 80 includes a cartridge 82 and a plurality of filter members 84. The cartridge is made of a needle punched polypropylene sorbent, a flexible cloth-like filter material. The filter members 84 are stacked one on top of the other within the cartridge 82. More specifically, there are eight filter members 84 made of C-media filter material which may be purchased from Ohio Air Systems, Inc. in Toledo, Ohio. A filter divider 86 is disposed within the two groups of four filter members 84 as well as between the bottom 26 of the receptacle 22' and the next adjacent filter member 84. The cartridge 82, filter members 84 and dividers 86 all conform to the shape of the receptacle 22', which in this case, is a box-like structure. However, the dividers 86 are thinner than the filter members 84 and are made of a polypropylene homo-polymer which is a cloth-like filter absorbent material and is more dense than the filter members 84. The filter divider 86 may also be purchased from Ohio Air Systems, Inc. Both the filter members 84 and dividers 86 are porous, allowing water to pass therethrough while retaining grease and other such viscous fluids within the filter element 80 as discussed in greater detail below.

In its operative mode, the grease filter system 20 of the subject invention shown in FIGS. 5 and 6 allows rainwater, condensed steam, grease and other liquid by-products of combustion to flow from the roof or fan vent of an exhaust system for a commercial food preparation environment without allowing grease to be dumped onto the roof of the building. More specifically, rainwater, condensed steam, grease and other liquid by-products of combustion will flow through the trough 96 and fall upon the inclined portion 98 of the lid 24' of the receptacle 22. The fluid will then be dispersed over the filter element 80 as it flows over the incline portion 98 and through holes 62 into the open ended cartridge 82 and onto the filter members 84. Rainwater, condensed steam and other such products of combustion pass completely through the filter member 84 as well as the dividers 86 and then out the cartridge 82. Water and other such fluids will then flow out the holes 56 on the sidewalls 102, 104 and 106 of the receptacle 22' and onto the roof 18. These fluids are then removed via the roof's drainage system. On the other hand, grease and all other such viscous fluids will be captured by combination of the filter elements 84, the filter dividers 86, as well as the cartridge 82. In this way, water, steam, etc., are allowed to pass through the filter system 20 while grease and other such viscous fluids are retained therein.

When the filter element 80 is spent, it may be easily removed by an operator by grasping handles 90 disposed at the upper portion of the filter element 80 and a new filter element 80 inserted into the receptacle 22.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A grease filter system for use in connection with retaining viscous products of combustion in commercial food preparation environments, said filter system comprising:

a receptacle and a filter element removably supported within said receptacle;

said receptacle having a top covering one end thereof and a bottom, said top including an opening through which grease, condensed steam, water and other products of combustion enter said system, said top further including a grease dispersion tray including a portion which is inclined relative to the general plane of said top, said grease dispersion tray having a plurality of holes disposed along said inclined portion in the path of grease such that the grease moves over the dispersion tray and is spread over said filter element, said receptacle further including a plurality of apertures disposed spaced from said bottom about the perimeter of said receptacle such that said filter system retains grease and other viscous fluids in said filter element while allowing condensed steam, water and other products of combustion to pass through said filter element and out said receptacle through said apertures.

2. A filter system as set forth in claim 1 wherein said filter element includes a filter member and a brace bracket which supports said filter member within said receptacle and spaced from said bottom of said receptacle.

3. A filter system as set forth in claim 2 wherein said filter element includes a core shaft which extends upwardly within said receptacle and extends through said brace bracket to present at least one stud member which engages said bottom of said receptacle and serves to space said brace bracket from said bottom of said receptacle and presents a gap between said bottom of said receptacle and said filter element.

4. A filter system as set forth in claim 3 wherein said core shaft extends through the center of said filter member and includes a handle to facilitate the insertion and removal of said filter element into and out of said receptacle.

5. A filter system as set forth in claim 1 wherein said plurality of apertures extend through said receptacle about the perimeter thereof and correspond to said gap between said filter element and said bottom of said receptacle.

6. A filter system as set forth in claim 1 wherein said receptacle further includes side walls having a slight taper diverging from said bottom upwardly toward a lip of said receptacle, said lip covered by said top.

7. A filter system as set forth in claim 6 wherein said receptacle includes a plurality of holes extending therethrough and disposed about the perimeter thereof near said lip for cooling said filter system and venting gaseous exhaust.

8. A filter system as set forth in claim 7 wherein said receptacle is substantially cylindrical in shape and circular in cross-section with a plurality of ribs disposed proximal to said lip for strengthening said receptacle.

9. A filter system as set forth in claim 1 wherein said filter element includes a removable cartridge and a plurality of filter members disposed within said filter cartridge.

10. A filter system as set forth in claim 9 wherein said plurality of filter members are stacked one on top of the other within said cartridge for providing a sequential filter which retains viscous fluids therein while letting less viscous liquids, such as water, pass therethrough.

11. A filter system as set forth in claim 10 wherein said plurality of said filter members are divided into at least two groups with a filter divider disposed between said at least two groups of filter members.

12. A filter system as set forth in claim 9 wherein said cartridge is made of a needle punch polypropylene sorbet material.

13. A filter system as set forth in claim 9 wherein said filter members are made of a C-media material.

14. A filter system as set forth in claim 11 wherein said divider is made of a polypropylene homopolymer.

15. A filter system as set forth in claim 1 wherein said receptacle is mounted to the exhaust system, said top having a portion disposed at an incline relative to the plane of said lid, said portion including a plurality of apertures over which grease and other fluids flow and are dispersed over said filter element.

16. A grease filter system for use in connection with retaining viscous products of combustion in commercial food preparation environments, said filter system comprising:

a receptacle and a filter element removably supported within said receptacle;

said receptacle being mounted to the exhaust system and having a top covering one end thereof and a bottom, said top having a grease dispersion tray including a portion disposed at an incline relative to the plane of said top over which grease, condensed steam, water and other products of combustion flows and enters said filter system, said grease dispersion tray having a plurality of holes disposed along said incline portion in the path of grease such that the grease moves over the dispersion tray and is spread over said filter element, said receptacle further including a plurality of apertures disposed spaced from said bottom about the perimeter of said receptacle such that said filter system retains grease and other viscous fluids in said filter element while allowing condensed steam, water and other products of combustion to pass through said filter element and out said receptacle through said apertures.

17. A filter system as set forth in claim 16 wherein said filter element includes a removable cartridge and a plurality of filter members disposed within said filter cartridge.

18. A filter system as set forth in claim 17 wherein said plurality of filter members are stacked one on top of the other within said cartridge for providing a sequential filter which retains viscous fluids therein while letting less viscous liquids, such as water, pass therethrough.

19. A filter system as set forth in claim 18 wherein said plurality of said filter members are divided into at least two groups with a filter divider disposed between said at least two groups of filter members.

* * * * *